United States Patent [19]
Takagi et al.

[11] Patent Number: 4,600,748
[45] Date of Patent: Jul. 15, 1986

[54] POLYOLEFIN COMPOSITION

[75] Inventors: Kaneyuki Takagi, Tokyo; Yoichi Kawai, Yokohama; Yoshiyasu Kamiya, Kawasaki, all of Japan

[73] Assignees: Daiwa Company Limited; Mitsui Toatsu Chemicals Inc., both of Tokyo, Japan

[21] Appl. No.: 705,525

[22] Filed: Feb. 26, 1985

[51] Int. Cl.⁴ .................................................. C08L 77/02
[52] U.S. Cl. .................................... 525/133; 525/145; 427/393.5
[58] Field of Search ........................ 525/145, 133, 179

[56] References Cited

U.S. PATENT DOCUMENTS 3,928,526  12/1975  Koyama .......................... 525/145 X
4,476,277  10/1984  Koyama et al. ..................... 524/509

FOREIGN PATENT DOCUMENTS 46662   11/1980  Japan .
195734  12/1982  Japan .
50171   12/1984  Japan .

*Primary Examiner*—Theodore E. Pertilla
*Attorney, Agent, or Firm*—Oblon, Fisher, Spivak, McClelland & Maier

[57] ABSTRACT

A polyolefin composition comprising 100 parts by weight of polyolefin, not less than 0.5 part by weight of a polyamide selected from the group consisting of nylon 6 and nylon 66, and from 3 to 30 percent by weight of novolak based on the weight of the polyamide; and a method of making polyolefin molded articles having surface improved in secondary processable property, which is characterized by treating the surface of molded articles of the polyolefin composition with a solution comprising: (a) not less than 2 percent by weight of a monomer having at least one carbon-carbon double bond and a glycidyl group, (b) 1 to 5 percent by weight of chlorinated polyolefin, and (c) not more than 97 percent by weight of a mixed solvent of 30 to 70 percent by weight of terpenic solvent and 70 to 30 percent by weight of aromatic or chlorinated hydrocarbon solvent.

12 Claims, No Drawings

POLYOLEFIN COMPOSITION

BACKGROUND OF THE INVENTION

1. Field of the Invention

This invention relates to a polyolefin composition having improved secondary processing properties such as paintability (coating fitness), printability and adherable property as well as good physical properties and particularly, a polyolefin composition containing polyamide and having a low melt temperature.

2. Prior Art

Polyolefins have neither polar group nor active group showing reactivity in their molecular structure and are poor in a solubility in solvents, therefore they are excellent in resistance to chemicals and solvents, but they are inferior in such secondary processing properties as paintability, printability and adherable property. Various methods have been proposed to improve these secondary processing properties of polyolefins.

In printing, a flame-treatment or a corona discharge treatment is generally employed, but these techniques involve the disadvantage that the shape of the moldings which are processed is restricted.

In adhesion, a chemical surface treatment is known where the surface of a molding is oxidized with a chromium acid-sulfuric acid mixed solution; however, in this method there are disadvantages that dangerous chemicals are used, operations are complicated and the treated surface lose lustre. Further, local treatment is difficult.

In coating, several methods are known, that is, a plasma treatment at lower temperature, graftpolymerizing method wherein a monomer having a functional group is graftpolymerized onto the surface of molded articles, or the like, but these methods are useless from the standpoint of practical use.

And various primer coating methods have been proposed, but they are inconvenient because the primer is expensive and requires baking, or because applicable paints on to the primer coating are restricted.

Also it has been tried to copolymerize an olefin with a comonomer having a functional group, but the resulting copolymer is not good in paintability, although it is good in melt adherable property to metal.

The inventors of this invention have found that a surface treatment with a chlorinated polyolefin solution improves paintability of molded articles of a blended polymer consisting of polyolefin, polystyrene and thermoplastic elastomer (see Japanese Patent Publication Nos. 46662/1980 and 50171/1984). The blended polymer maintains its practical performance based on the polyolefin but is deteriorated in such properties as rigidity or stiffness, surface hardness, resistance to heat deformation, and surface gloss of molded articles. Decreases in rigidity or stiffness and resistance to heat deformation can be made up for by the addition of filler but decreases in surface hardness, particularly scratch resistance and surface gloss, cannot be made up for by any means.

One of the inventors of this invention has found that a surface treatment with a solution of chlorinated polyolefin and a monomer having carbon-carbon double bond and a glycidyl group in a mixed solvent of terpenic solvent and aromatic or chlorinated hydrocarbon solvent remarkably improves the paintability of molded articles of the blended polymer above described as compared with the solution containing only chlorinated polyolefin. Namely, the surfaces of molded articles thus treated become receptive to more kinds of paint and are more glossy in comparison to the surfaces of articles treated with the solution containing only a chlorinated polyolefin (see Japanese Patent Laid-Open Application No. 195734/1982).

However, it is useless from the standpoint of practical use to apply the treatment just mentioned above to the surface of molded articles of the blended-polymer, because the surface is less resistant to scratching and the difference in gloss between treated and untreated surface of the molded articles is striking.

The inventors of this invention have carried out studies in search of a polyolefin composition, which causes no deterioration of the physical properties of the articles and makes the surface receptive to more kinds of paint, by the treatment with the chlorinated polyolefin solution. As a result, they found that a polyolefin composition comprising polyolefin and a minor amount of polyamide dispersed therein achieves the object above mentioned.

The molding temperature of the blended polymer of the polyolefin and the polyamide has to be higher than the melting temperature of the polyamide (nylon 6: 218° C., nylon 66: 259° C.). This results in the following disadvantages:

(1) The blended polymer cannot be molded by blow or extrusion molding which should be carried out at a low molding temperature.
(2) It is necessary to mold the blended polymer at a high temperature at which it is impossible to achieve the main object of injection molding, that is, making the cycle time shorter by low temperature molding.
(3) When such a heat decomposable organic filler as woodflour is blended with the blended polymer or when the resulting blended polymer is molded, the temperature of the blended polymer should be higher than 200° C. at which the filler decomposition is accelerated. The gas thus formed makes silver streaks on the surface of the molded articles which as a result are unusable as a base material for external use or coating. Further, the gas may rust the mold.

SUMMARY OF THE INVENTION

An object of this invention is to provide a polyolefin composition containing polyamide and having a low melting temperature and good molding properties.

Another object of this invention is to provide a method of making polyolefin moldings having good secondary processing properties.

The inventors of this invention have studied a method of lowering the melting temperature of polyamide and have found that when novolak obtained by a condensation reaction between phenol and formaldehyde in the presence of an acid catalyst is mixed with polyamide and heated, the novolak melts first and the polyamide then melts into the melted novolak. Further study shown that by blending a minor amount of novolak with the polyamide it is possible to lower the molding temperature of the polyamide by about 50° C. without significant deterioration of mechanical properties. Table 1 shows the physical properties and molding conditions of nylon 6 to which about 10 percent by weight of phenolic novolak was added.

The objects of this invention have been achieved by these findings.

TABLE 1

|  |  | Nylon 6 containing 10% novolak | Nylon 6 |
|---|---|---|---|
| Yield Strength (ASTM D638) | kg/cm$^2$ | 585 | 600 |
| Elongation (ASTM D638) | % | 52 | 80 |
| Bending strength (ASTM D790) | kg/cm$^2$ | 913 | 1,000 |
| Bending modulus (ASTM D790) | kg/cm$^2$ | 29,000 | 28,000 |
| Du-Pont impact strength (according to JIS K6718) | kg · cm/φ½ in. | 2-3 | 5-6 |
| at 23° C. | kg · cm/cm | 5.2 | 5 |
| at −10° C. | kg · cm/cm | 3.1 | — |
| Rockwell hardness (ASTM D785) | R | 117 | 120 |
| Heat deformation temperature (ASTM D648, 4.6 kg) | °C. | 155 | 150 |
| Molding temperature |  |  |  |
| set | °C. | 190 | 240 |
| found | °C. | 210 | 260 |

This invention provides a polyolefin composition comprising 100 parts by weight of polyolefin, not less than 0.5 part by weight of polyamide selected from the group consisting of nylon 6 and nylon 66, and from 3 to 30 percent by weight of novolak based on the weight of the polyamide.

This invention also provides a method of making polyolefin moldings having surface improved in secondary processing properties, which is characterized by the treatment of the surface of polyolefin moldings obtained from the polyolefin resin composition with a solution comprising:
(a) not less than 2 percent by weight of a monomer having at least one carbon-carbon double bond and a glycidyl group,
(b) 1 to 5 percent by weight of chlorinated polyolefin, and
(c) 97 percent by weight of a mixed solvent of 30 to 70 percent by weight of terpenic solvent and 70 to 30 percent by weight of aromatic or chlorinated hydrocarbon solvent.

The polyolefins usable in this invention includes homopolymers or copolymers of α-olefin having 2 to 6 carbon atoms such as ethylene, propylene, butylene and methylpentene; copolymer of α-olefin and comonomer such as vinyl acetate and acrylic ester; and a mixture of those polymers. Among them, polypropylene resin is preferable.

The amount of the polyamide added is not less than 0.5 part by weight based on 100 parts by weight of the polyolefin. Less than 0.5 part by weight of the polyamide produces an insufficient surface modification effect. The upper limit of the amount of the polyamide is not critical because the increase in the amount of the polyamide does not deteriorate either the physical properties or the surface modification effect, though it may improve them.

The novolak which can be added to the polyolefin composition of this invention is obtained by polycondensation between such a monohydric phenol as phenol, cresol, p-tert-butyl phenol, p-phenyl phenol or terpene phenol, and formaldehyde in the presence of such acid catalyst as hydrochloric acid or oxalic acid. When the amount of novolak added is less than 3 percent by weight based on the polyamide, the melting temperature of the polyamide in the polyolefin composition is not lowered to a sufficient degree for practical use. The greater the amount of novolak added, the lower the melting temperature of the polyamide in the polyolefin composition becomes. However, more than 30 percent by weight of novolak based on the polyamide may deteriorate the paintability of the resulting polyolefin composition. Typically, the novolak amount should preferably be in the range of 10 to 20 percent by weight based on the polyamide.

Such additives as stabilizers, polymers, antistatic agents, fire-retardants, colorants, inorganic or organic filler can be added in the polyolefin composition.

In order to disperse the polyamide containing novolak into the polyolefin, it is beneficial to add the polyamide and the novolak to the polyolefin and melt-knead the resulting mixture.

Melt-kneading of the resulting mixture is effected by a continuous Banbury mixer having high mixing effect, a twin-screw extruder, a single screw extruder provided with a screw having a mixing head of a special shape which is designed to increase the kneading effect. Poor kneading results in insufficient modification of the surface of the molded articles of resulting polyolefin composition.

The three compounds: the polyolefin, the polyamide and the novolak, may be melt-kneaded at the same time or, the latter two components may be melt-kneaded, followed by the addition of the polyolefin thereto. The temperature at which the components are kneaded is preferably higher than the melting temperature of the polyamide by not less than 50° C. But it can be lowered by 20° to 50° C., if the polyamide is first kneaded with the novolak e.g. 10 percent by weight of the polyamide), followed by the addition of the polyolefin thereto.

The polyolefin composition according to this invention is low in melting temperature in spite of the existence of the polyamide having a high melting temperature because it contains the novolak, so that it can suitably be used as a high flow grade for injection molding, and also be used as a blow or extrusion molding grade. Further, it is also possible to knead it with heat-decomposable organic filler such as woodflour at a low temperature without any significant decomposition thereof.

The molded article obtained from the polyolefin composition of this invention is treated with the chlorinated polyolefin solution to improve the paintability and adherable property of its surface without any deterioration of the physical properties thereof.

When the surface of molded articles of this polyolefin composition is treated with a solution of chlorinated polyolefin and a monomer having at least one carbon-carbon bond and a glycidyl group in a terpene-containing solvent, the resulting surface has good printability and a gloss comparable to the non-treated surface.

The clorinated polyolefin solution which can be used to treat the surface of the molded articles preferably contains not less than one percent by weight of chlorinated polypropylene, chlorinated polyethylene or both, which contains at least 10 percent, preferably 30 to 70 percent, by weight of chlorine, dissolved in such a solvent as aromatic or chlorinated hydrocarbon solvent having a boiling temperature of 80° to 130° C. More specifically, the following solution is used to obtain the surface having good printability:

(a) not less than 2 percent by weight of the monomer having at least one carbon-carbon double bond and a glycidyl group, examples of which monomer include glycidyl allyl ether, glycidyl acrylate and glycidyl methacrylate,
(b) 1 to 5 percent by weight of the chlorinated polyolefin, and
(c) not more than 97 percent by weight of a mixed solvent consisting of 30 to 70 percent by weight of terpenic solvent such as -pinene, dipentene or a mixture thereof and 70 to 30 percent by weight of aromatic or chlorinated hydrocarbon solvent.

Molded articles may be treated with the solution by applying it with a spray gun, brush or roll or by dipping, followed by drying.

Even such a small amount as one percent by weight of the polyamide can improve the secondary processing properties of the polyolefin. A masterbatch containing 10 to 30 percent by weight of the polyamide is conveniently used to produce molded articles having good secondary processing properties with ease and at a low price without deterioration of the physical properties of the polyolefin.

This invention is very useful from the industrial point of view and will now be explained more in detail with reference to the following Examples to which this invention is not limited in any way.

was passed between a pair of chill rolls to form a web which was then pulverized by a pulverizer. The compound thus pulverized was injection-molded to form specimens (160×80×2 mm). The conditions of the injection molding are shown in Table 2. The results show that the novolak-containing blended polymer can be molded at a temperature lower by about 20° to 50° C. than the blended polymer containing no novolak.

The specimens were subjected to the coating test under the conditions shown in Table 2.

Surface of the coated specimens were tested by cross cut test. The cross cut test was conducted in the manner that eleven longitudinal and horizontal cutting traces were provided on the surface (paint film) of the test piece at a distance of 1 mm on an area of 10 $mm^2$, and adhesive cellophane tape having a width 18 mm was adhered thereto and rapidly peeled in a direction at 45° to the test piece to observe the percentage of the paint film unpeeled. The results are as shown in Table 2.

The molding temperature of the composition of Sample 1 containing 10 percent by weight of novolak based on the nylon 6 is reduced to 200° C. from the 238° C. molding temperature of Comparative Sample 1 which did not contain novolak. Similarly, the molding temperature of Sample 6 containing 10 percent by weight of novolak based on the nylon 66 was reduced to 260° C. from the 280° C. molding temperature of Comparative Sample 2 which did not contain novolak.

TABLE 2

| | Sample | | | | | | | Comparative Sample | | | |
|---|---|---|---|---|---|---|---|---|---|---|---|
| | 1 | 2 | 3 | 4 | 5 | 6 | 7 | 1 | 2 | 3 | 4 |
| Components | | | | | | | | | | | |
| Polyolefin | | | | | | | | | | | |
| Polypropylene (1) | 70.0 | 90.0 | 99.0 | 99.0 | 99.0 | 99.0 | — | 99.0 | 99.0 | 100.0 | 99.0 |
| Polyethylene (2) | — | — | — | — | — | — | 90.0 | — | — | — | — |
| Polyamide | | | | | | | | | | | |
| Nylon 6 (3) | 27.0 | 9.0 | 0.9 | 0.9 | 0.9 | — | 9.0 | 1.0 | — | — | 0.45 |
| Nylon 66 (4) | — | — | — | — | — | 0.9 | — | — | 1.0 | — | — |
| Phenolic novolak (5) | 3.0 | 1.0 | 0.1 | 0.1 | 0.1 | 0.1 | 1.0 | — | — | — | 0.05 |
| Filler | | | | | | | | | | | |
| talc | 25.0 | 25.0 | 25.0 | — | — | 25.0 | 25.0 | 25.0 | — | 25.0 | 25.0 |
| woodflour | — | — | — | 25.0 | — | — | — | — | — | — | — |
| Molding Temperature (°C.) | | | | | | | | | | | |
| Set: Nozzle | 190 | 190 | 190 | 190 | 190 | 260 | 190 | 240 | 180 | 190 | 190 |
| No. 1 (near nozzle) | 180 | 180 | 180 | 175 | 180 | 250 | 180 | 240 | 280 | 180 | 180 |
| No. 2 (remote from nozzle) | 175 | 175 | 175 | 175 | 175 | 240 | 175 | 230 | 270 | 175 | 175 |
| Found: Resin temperature | | | 200 | 205 | 20 | 260 | | 238 | 280 | 190 | |
| Coatability* | | | | | | | | | | | |
| Non-pretreated: | | | | | | | | | | | |
| Paint A | 100 | 100 | 100 | 100 | 100 | 100 | — | 100 | 100 | 0 | 63 |
| Paint B | 100 | 100 | 100 | 100 | 100 | 100 | 83 | 100 | 100 | 0 | 85 |
| Pretreated: | | | | | | | | | | | |
| Paint C | 100 | 100 | 100 | 100 | 100 | 100 | — | 100 | 100 | 0 | 60 |
| Paint D | 100 | 100 | 100 | 100 | 100 | 100 | — | 100 | 100 | 0 | 68 |
| Paint E | 100 | 100 | 100 | 100 | 100 | 100 | — | 100 | 100 | 0 | 35 |
| Paint F | 100 | 100 | 100 | 100 | 100 | 100 | — | 100 | 100 | 0 | 65 |

(1) MITSUI NOBLEN J3HG of MITSUI - TOATSU CHEMICALS INC.
(2) HIZEX J of MITSUI PETROCHEMICAL INDUSTRIES, LTD.
(3) NYLON CM 1021 of TORAY
(4) NYLON CM 3001 M of TORAY
(5) TAMANOL 803 (Terpene Phenol) of ARAKAWA CHEMICAL INDUSTRIES, LTD.
Paint A: HI-PLUS 305 TK(2) (acrylic type) of KAWAKAMI PAINT CO., LTD. (dried at 40° C. for 30 minutes)
Paint B: UREALL 600 (acrylic-urethane type) of KAWAKAMI PAINT CO., LTD. (baked at 110° C. for 20 minutes)
Paint C: HI-PLUS 150 HB (acrylic-melamine type) of KAWAKAMI PAINT CO., LTD. (baked at 110° C. for 20 minutes)
Paint D: UREALL for lacquerware (urethane type) of KAWAKAMI PAINT CO., LTD. (baked at 110° C. for 20 minutes)
Paint E: POLYTACK 6000 of TOHO KAKEN MANUFACTURING INC. (baked at 110° C. for 20 minutes)
Paint F: RABI (urethane type) of OHASHI CHEMICAL INDUSTRIES, INC. (baked at 110° C. for 20 minutes)

EXAMPLE 1

A mixture having the formulation listed in Table 2 was melt-kneaded by a kneading machine (FCM continuous melt-kneader, a product of KOBE STEEL LTD.). The melted compound discharged from the machine Pretreating solution A solution of 4 percent chlorinated polypropylene (chlorine content: 67 percent) in 1,1,1-trichloroethane.

EXAMPLE 2

Propylene-ethylene block copolymer (MITSUI NOBLEN BJHH-M of MITSUI-TOATSU CHEMICALS INC.) (89 parts by weight), Nylon 6 (CM 1021 of TORAY) (10 parts by weight) and terpene phenolic novolak (TAMANOL 803 of ARAKAWA CHEMICAL INDUSTRIES, LTD.) (one part by weight) were kneaded by Henschel mixer, followed by melt-kneading by a melt-kneading machine (FCM continuous melt-kneader, a product of KOBE STEEL LTD.) to form pellets of a polypropylene composition containing 10 percent by weight of Nylon 6. The polypropylene composition (10 parts by weight) and the propylene-ethylene block copolymer (90 parts by weight) (MITSUI NOBLEN BJHH-G of MITSUI-TOATSU CHEMICALS INC.) were mixed and injection-molded to form test pieces of the same size as in Example 1. The test pieces were evaluated as to its physical properties, paintability, adherable property and printability. The test results of the physical properties are shown in Table 3.

TABLE 3

|  |  | Example 2 | MITSUI NOBLEN BJHH-M |
|---|---|---|---|
| Melt index (ASTM D 1238) | g/10 min | 8.0 | 8.0 |
| Yield strength (ASTM D 638) | kg/cm$^2$ | 298.0 | 295 |
| Elongation (ASTM D638) | % | 65 | 58 |
| Bending strength (ASTM D790) | kg/cm$^2$ | 398 | 395 |
| Bending modulus (ASTM D790) | kg/cm$^2$ | 15400 | 15500 |
| Du-Pont impact strength (according to JIS K 6178) | kg · cm/$\phi\frac{1}{2}$ in. | | |
| at 23° C. | | 50-55 | 55-60 |
| at −10° C. | | 35-40 | 40-45 |
| Izod impact strength (ASTM D 256) | kg · cm/cm | | |
| at 23° C. | | 6.4 | 7.5 |
| at −10° C. | | 3.4 | 3.2 |
| Rockwell hardness (ASTM D785) | R | 93 | 95 |
| Heat deformation temperature (ASTM D648, 4.6 kg) | °C. | 113 | 115 |

The same paintability test as that of Example 1 showed that none film of those paints was peeled off.

Adherable property test

Test pieces A (25 mm × 125 mm) and B (10 mm × 80 mm) were prepared from the injection molded piece. Using these test pieces, test samples adhered by the adhesive shown in Table 4 were prepared. Adhesive strength of each test sample is measured by tensile test instrument. The test results are shown in Table 4. The value is mean value of 5 samples.

TABLE 4

|  | Peeling | Tensile shear | |
|---|---|---|---|
| Test piece | A | B | B |
| Material to which a test piece is adhered. | Cotton canvas tape | B | B |
| Pretreatment | 4% chlorinated polypropylene solution in trichloroethane. | | |
| Adhesive | DIABOND (chloroprene type) of NOGAWA CHEMICAL CO., LTD. | ALONALPHA (cyanoacrylate type) of TOA GOSEI CHEMICAL INDUSTRIES, LTD. | CEMEDINE SUPER (epoxy type) of CEMEDINE CO., LTD. |
| Measurement (after 72 hours at 23%) | | | |
| Strain rate | 30 mm/min. | 200 mm/min. | |
| Angle | 180° | | |
| Result | 5-7 Kg/25 mm | 19.1 Kg/cm$^2$ | 16.5 Kg/cm$^2$ |

Printability test

The test piece was treated with urethane sponge impregnated with a pretreatment liquid, followed by drying. Screen-printing was effected on the treated surface using a urethane type ink or an epoxy type ink. The printed test piece was subjected to baking at 100° C. for 20 minutes, and was then left to stand at room temperature for 24 hours. The test piece thus treated was subjected to a cross cut test. No peeling was observed on either test piece.

The pretreatment liquid

|  | parts by weight |
|---|---|
| Glycidyl allyl ether | 5 |
| Chlorinated polypropylene (chlorine content: 67%) | 2 |
| Chlorinated polypropylene (chlorine content: 33%) | 2 |
| 1,1,1-trichloroethane- | 45.5 |
| pinene | 45.5 |

Printing ink

Urethane type: SS 16-611 of TOYO INK SEIZO MANUFACTURING CO., LTD.

Epoxy type: SSCTCL of TOYO INK SEIZO MANUFACTURING CO., LTD.

What we claim is:

1. A polyolefin composition comprising: 100 parts by weight of polyolefin, not less than 0.5 part by weight of a polyamide selected from the group consisting of nylon 6 and nylon 66, and from 3 to 30 percent by weight of a novolak based on the weight of the polyamide.

2. The polyolefin composition of claim 1, wherein said polyolefin is polypropylene.

3. The polyolefin composition of claim 1, wherein said polyamide is nylon 6.

4. The polyolefin composition of claim 1, wherein said polyamide is nylon 66.

5. The polyolefin composition of claim 1, wherein said novolak is phenolic novolak.

6. The polyolefin composition of claim 1, wherein said novolak is a terpene phenolic novolak.

7. The polyolefin composition of claim 1, wherein said polyolefin is a homopolymer of an α-olefin having 2-6 carbon atoms.

8. The polyolefin composition of claim 7 wherein said homopolymer is a polymer of ethylene, propylene, butylene or methylpentene.

9. The polyolefin composition of claim 1, wherein said polyolefin is a copolymer of an α-olefin and vinyl acetate or acrylic ester as a comonomer.

10. The polyolefin composition of claim 1, wherein said novolak is prepared from a monohydric phenol which is phenol, cresol, p-tert-butyl phenol, p-phenyl phenol or terpene phenol.

11. The polyolefin of claim 1, wherein the amount of said novolak component in said composition ranges from 10-20 weight %.

12. The polyolefin composition of claim 1, which further comprises at least one additive selected from the group consisting of stabilizers, polymers, antistatic agents, fire-retardants, colorants, inorganic fillers and organic fillers.

* * * * *